United States Patent Office 2,883,298
Patented Apr. 21, 1959

2,883,298
DISSOLVING POLYANIONIC SALTS IN WATER

Geoffrey W. Meadows, Kennett Square, Pa., assignor to E. I. du Pont de Nemours and Company, Wilmington, Del., a corporation of Delaware No Drawing. Application January 7, 1957
Serial No. 632,632

4 Claims. (Cl. 106—164)

This invention relates to pulverulent water-soluble polyanionic salt compositions containing calcium chloride.

Polyanionic salts are difficult to dissolve in water and characteristically form lumps of gel or gummy masses, called "fish eyes," even when they are added to water in finely divided form under conditions of vigorous agitation. The lumps or masses are slow to dissolve and it is hard to prepare a homogeneous solution, particularly under field conditions using conventional equipment.

The compositions and methods of this invention relate to compositions comprising mixtures of calcium chloride and water-soluble polyanionic salts which are remarkably easy to dissolve in water. The mixtures contain powdered calcium chloride and a powdered water-soluble polyanionic salt in the ratio from 1:50 to 1:1 parts by weight, and preferably in the range 1:20 to 1:4 parts by weight. Such mixtures disperse immediately when added to water and the polyelectrolyte component goes into solution easily and rapidly, with only moderate agitation being required.

The water-soluble polyanionic salts useful in the practice of the invention are conveniently represented by the formula:

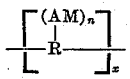

where R is a repeating unit in a polymeric chain, for example:

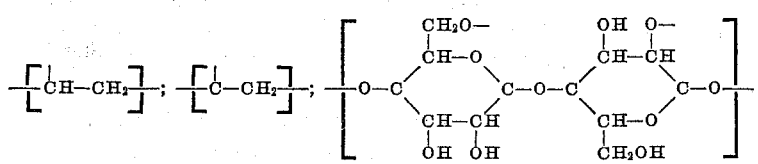

A is an anionic group, for example
—COO⁻, —CH₂·COO⁻, SO₃⁻, —CS₂⁻

M is H⁺, NH₄⁺, alkali metal, alkali metal earth or other salt forming group with the limitation that not more than half the M substituents on the polymer are H⁺;

n is an integer not greater than 3;

x, the degree of polymerization is at least 50 and preferably greater than 200.

The expression "water soluble" as used in the specification and claims means that the polyanionic salt dissolves in water to the extent of at least one part per thousand parts of water, by weight, to give a homogeneous solution.

In addition to calcium chloride and a polyanionic salt the compositions can contain conventional inerts and anti-caking agents such as bentonite, talc, kaolin, diatomaceous earth, fly ash, pyrophyllite, lime, calcium carbonate, and sodium sulfate.

Wetting agents can also be incorporated in the compositions to further facilitate the ease of solution of the active component in water. The wetting agents which are used will be either of the non-ionic or anionic types, preferably the latter. Examples of typical wetting agents are polyoxypropylene polyoxyethylene condensates, ethylene and propylene oxide addition products with ethylenediamine, alkyl aryl polyether alcohols, fatty acid esters, fatty alcohol sulfate salts, alkyl benzene sulfate salts, alkyl aryl sulfonate salts.

The inerts, anticaking agents, or wetting agents can be present in any proportion in the polyanionic salt—calcium chloride composition but we prefer to use not in excess of 20% by weight of each of these substances in our compositions.

The compositions are prepared by mixing the powdered components in conventional blending equipment, grinding if necessary, until the particles are in the required size range, and reblending to obtain a uniform composition.

The compositions must be in finely divided form with preferably all the sample passing a 20-mesh U.S. Bureau of Standards sieve. However, no advantage is gained beyond a certain degree of particle diminution so that, in general, not more than 50% of the sample need pass a 100-mesh sieve.

Calcium chloride possesses a unique solubilizing action with respect to polyanionic salts. Many other inorganic salts, a number of them more soluble in water than calcium chloride, have been substituted for calcium chloride in the compositions of the invention but no comparable effect on the ease of solution of the polyanionic salt component has been observed. Anhydrous calcium chloride or the monohydrate are preferred for purposes of the invention although satisfactory results are obtainable with the dihydrate or hexahydrate.

The following are examples of typical water-soluble polyanionic salts which may be used in the practice of the invention. The ammonium, alkali metal and alkali metal earth salts of polyacrylic acid, polymethacrylic acid, carboxymethylcellulose, cellulose xanthic acid, hydrolyzed polyacrylonitrile, hydrolyzed acrylonitrile/vinyl acetate copolymer, maleic anhydride/vinyl acetate copolymer, maleic anhydride/isobutene copolymer, maleic anhydride/styrene copolymer, maleic anhydride/vinyl ether copolymer, itaconic anhydride/styrene copolymer, itaconic anhydride/vinyl acetate copolymer and sulfonated styrene.

Particularly preferred compositions are those containing sodium cellulose xanthate, calcium oxide and calcium chloride, the components being present in the ratios covered by the range 20:4:1 to 4:20:1.

The compositions of the invention are useful for any purpose in which it is necessary to obtain an aqueous solution of a polyanionic salt. More specifically such salts are particularly useful as soil conditioners and erosion controllers.

In order that the invention may be better understood, the following examples are given:

EXAMPLE 1

50 parts by weight of oven dried sodium cellulose xanthate having a degree of xanthation of 0.72, a degree of polymerization of 610 and a water content of 3.5% are mixed with 40 parts by weight of calcium oxide and 10 parts by weight of anhydrous calcium chloride. The mixture is ground in a hammer mill in an atmosphere of cold dry nitrogen to pass a 50-mesh U.S. Bureau of Standards sieve and then is further blended by rolling in a horizontal cylindrical blender.

25 pounds of the resulting formulation is added to 100 gallons of water in a spraying tank with moderate agitation from a paddle stirrer. The added composition disperses rapidly and the cellulose xanthate component dissolves in a few minutes to give a solution suitable for spraying onto a freshly seeded embankment to stabilize the soil against erosion prior to the establishment of a vegetative cover.

EXAMPLES 2 TO 17

The compositions described below in tabular form are prepared by pulverizing and blending the components in the proportions shown.

The resulting formulations disperse immediately on addition to water with moderate stirring and the polyanionic salt component rapidly goes into solution.

M is a salt forming group with the limitation that not more than half the M substituents on the polymer are H+, $n$ is an integer not greater than 3, and $x$ is an integer at least 50.

which comprises mixing powdered calcium chloride with such salts in a ratio from 1:50 to 1:1 parts by weight and then dissolving such mixture in water.

2. The method of claim 1 wherein said powdered polyanionic salts and said powdered calcium chloride both have a mesh size such that all material will pass a 20-mesh U.S. Bureau of Standards sieve.

3. A method for rapidly dissolving in water sodium cellulose xanthate which comprises mixing powdered calcium chloride with powdered sodium cellulose xanthate in a ratio of from 1:50 to 1:1 parts by weight and then dissolving such mixture in water.

4. A method for rapidly dissolving in water sodium

*Formulation Examples 2 to 17*

| Example No. | Polyanionic Salt | Parts | Parts CaCl₂ | Diluent | Parts | Wetting Agent | Parts |
|---|---|---|---|---|---|---|---|
| 2 | Sod. salt of hydrolyzed polyacrylonitrile | 90 | 10 | | | | |
| 3 | Sod. salt of maleic anhydride/styrene copolymer | 77 | 20 | | | Alkyl aryl polyther alcohol | 3 |
| 4 | Half calcium salt of maleic anhydride/vinyl acetate copolymer | 95 | 5 | | | | |
| 5 | Sodium polyacrylate | 90 | 10 | | | | 1 |
| 6 | Half ammonium salt of maleic anhydride/isobutene copolymer | 86 | 10 | | | Alkyl aryl polyether alcohol | 4 |
| 7 | Sodium salt of itaconic anhydride/vinyl acetate copolymer | 90 | 10 | | | | |
| 8 | Potassium polymethacrylate | 95 | 5 | | | | |
| 9 | Sodium carboxymethyl cellulose | 85 | 15 | | | | |
| 10 | ---do--- | 40 | 10 | Kaolin | 49 | Sod. lignin sulfate | 1 |
| 11 | ---do--- | 25 | 15 | Pyrophyllite | 59 | Sod. lauryl sulfate | 1 |
| 12 | Half calcium salt of maleic anhydride/vinyl acetate copolymer | 30 | 10 | Attapulgite | 60 | | |
| 13 | Half calcium salt of maleic anhydride/vinyl acetate copolymer | 25 | 14 | Calcium oxide | 60 | Alkyl aryl sulfonate | 1 |
| 14 | Sodium cellulose xanthate | 40 | 9 | Diatomaceous earth | 50 | ---do--- | 1 |
| 15 | ---do--- | 20 | 5 | Dehydrated Zeolite | 74 | ---do--- | 1 |
| 16 | ---do--- | 30 | 25 | ---do--- | 44 | ---do--- | 1 |
| 17 | Sodium salt of maleic anhydride/styrene copolymer | 60 | 14 | Talc | 25 | Sod. lauryl sulfate | 1 |

This application is a continuation-in-part of my copending application Serial Number 518,935, now U.S. Patent No. 2,825,655, filed June 20, 1955.

I claim:

1. A method for rapidly dissolving in water powdered polyanionic salts represented by the formula:

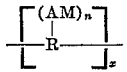

where:

R is a repeating unit in a polymeric chain,
A is an anionic group, cellulose xanthate which comprises mixing powdered calcium chloride with sodium cellulose xanthate in a ratio of from 1:50 to 1:1 parts by weight and then dissolving such mixture in water, the said sodium cellulose xanthate and the said calcium chloride having a mesh size such that both will pass a 20-mesh U.S. Bureau of Standards sieve.

References Cited in the file of this patent

UNITED STATES PATENTS 2,761,247    Meadows    Sept. 4, 1950
2,768,143    Henry    Oct. 23, 1956

UNITED STATES PATENT OFFICE

Certificate of Correction

Patent No. 2,883,298

Geoffrey W. Meadows

April 21, 1959

It is hereby certified that error appears in the printed specification of the above numbered patent requiring correction and that the said Letters Patent should read as corrected below.

Column 1, line 53 should appear as shown below instead of as in the patent:

—COO$^-$, —CH$_2$·COO$^-$, —SO$_3^-$, —CS$_2^-$

Signed and sealed this 15th day of September 1959.

[SEAL]

Attest:
KARL H. AXLINE,
*Attesting Officer.*

ROBERT C. WATSON,
*Commissioner of Patents.*